(12) United States Patent
Taira

(10) Patent No.: US 9,638,864 B2
(45) Date of Patent: May 2, 2017

(54) OPTICAL DEVICE

(71) Applicant: GLOBALFOUNDRIES INC., Grand Cayman (KY)

(72) Inventor: Yoichi Taira, Kanagawa-ken (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 116 days.

(21) Appl. No.: 14/299,354

(22) Filed: Jun. 9, 2014

(65) Prior Publication Data
US 2015/0003781 A1 Jan. 1, 2015

(30) Foreign Application Priority Data
Jun. 28, 2013 (JP) ................. 2013-136917

(51) Int. Cl.
*G02B 6/34* (2006.01)
*G02B 6/124* (2006.01)
*G02B 6/30* (2006.01)

(52) U.S. Cl.
CPC ............ *G02B 6/34* (2013.01); *G02B 6/124* (2013.01); *G02B 6/30* (2013.01)

(58) Field of Classification Search
CPC . G02B 6/30; G02B 6/34; G02B 6/124; G02B 6/3628
USPC ............ 385/14, 32, 37, 49, 50–52, 129–132
See application file for complete search history.

(56) References Cited

U.S. PATENT DOCUMENTS

2014/0270642 A1* 9/2014 Frish ................. G02B 6/34
385/37

FOREIGN PATENT DOCUMENTS

JP 2010-044290 2/2010
JP 2011-107384 6/2011

* cited by examiner

*Primary Examiner* — Akm Enayet Ullah
*Assistant Examiner* — Michael Mooney
(74) *Attorney, Agent, or Firm* — Scully Scott Murphy and Presser; Frank DiGiglio

(57) ABSTRACT

An optical device including a diffraction grating structure. The device provides optical coupling that allows the diffraction efficiency and the coupling efficiency of signal light whose direction to travel is changed (or diffracted) by a grating to be independently determined. The optical device includes: a first layer forming one end of an optical waveguide; and a second layer disposed on the first layer and having a lower refractive index than the first layer. According to one embodiment, the second layer includes a diffraction grating structure that diffracts light that has entered the second layer from the first layer and outputs the light from the second layer to the first layer. In another embodiment, a third layer disposed on the second layer and includes the diffraction grating structure.

15 Claims, 5 Drawing Sheets

OPTICAL DEVICE

CROSS-REFERENCE TO RELATED APPLICATION

This application claims priority under 35 U.S.C. §119 from Japanese Patent Application No. 2013-136917 filed Jun. 28, 2013, the entire contents of which are incorporated herein by reference.

BACKGROUND OF THE INVENTION

Field of the Invention

The present invention relates to optical communications technologies. More specifically, it relates to an optical device that inputs and outputs optical signals to and from an optical waveguide.

Description of Related Art

In optical communications technologies, particularly, in a silicon photonic technology for forming an optical waveguide in a silicon chip, it is extremely important to optically couple a silicon optical waveguide to an external optical fiber or a source laser in an effective manner.

Examples of methods developed for optical couplings include: 1) butt coupling for directly joining a silicon optical waveguide and another optical waveguide (including an optical fiber); 2) lens coupling for optically coupling a silicon optical waveguide and another optical waveguide via a microscopic lens interposed therebetween; and 3) diffraction grating coupling for optically coupling a silicon optical waveguide and another optical waveguide by fabricating an optical diffraction grating structure in the optical waveguide on the silicon substrate.

Butt coupling requires numerical aperture (NA) conversion because two optical waveguides have different NAs and also requires high accuracy in positioning the optical waveguides. Lens coupling requires fabrication of a three-dimensional lens and also requires fixed and highly accurate positioning of components such as the lens.

A diffraction grating formed on a silicon substrate is capable of NA conversion and the structure of a diffraction grating can be fabricated with high accuracy. However, fabrication of a diffraction grating in a silicon optical waveguide enables coupling such that signal light travels in both upward and downward directions, and thus it is difficult to achieve high coupling efficiency.

FIGS. 1(a) and 1(b) schematically illustrate optical device 10 having a grating (diffraction grating) structure that takes out or outputs signal light propagated through a silicon optical waveguide to the outside or takes in or inputs signal light to the silicon optical waveguide from the outside. FIG. 1(a) is a top plan view of optical device 10 and FIG. 1(b) is a cross sectional view of optical device 10 viewed from a side. FIGS. 1(a) and 1(b) illustrate the case where signal light is taken out or output from a silicon optical waveguide to the outside.

Optical device 10 includes oxide layer 12 on silicon substrate 11 and silicon optical waveguide 13 on oxide layer 12. Optical device 10 also includes grating coupler 14 at one end of the silicon optical waveguide 13. Grating coupler 14 has approximately parallel and concentric multiple grooves. Diffracted light subjected to diffraction by grating coupler 14 exits through oxide layer 12 and silicon substrate 11.

Japanese Patent Application Publication No. 2011-107384 discloses that, in a condensing grating coupler that is disposed on a substrate and that changes an optical path of signal light emitted from an optical waveguide upward with respect to the substrate, a grating coupling unit may be formed in a layer different from a core layer of the optical waveguide, such as an upper cladding layer or another layer provided separately.

Japanese Patent Application Publication No. 2010-44290 discloses that a light reflection film made of a material such as gold is formed on an overcladding layer that covers a grating formed at an end of the optical waveguide layer.

Typically, a diffraction grating for coupling a silicon optical waveguide is formed by processing a silicon layer that is the same as the core layer of the optical waveguide. However, directly processing a core layer would markedly affect a propagation mode, causing a large propagation loss. As in the case of optical device 10 illustrated in FIGS. 1(a) and 1(b), the diffraction efficiency and the coupling efficiency of a diffraction grating formed by directly processing a core layer are concurrently determined by only the depth by which the diffraction grating is processed. It is thus not easy to design and process a diffraction grating. An object of the present invention is to accomplish optical coupling that allows the diffraction efficiency and the coupling efficiency of a diffraction grating to be independently determined. This object of the present invention includes providing an optical device that can perform such optical coupling.

SUMMARY OF THE INVENTION

An optical device according to an embodiment of the present invention includes: a first layer forming one end of an optical waveguide; a second layer disposed on the first layer and having a lower refractive index than the first layer; and a third layer disposed on the second layer and including a diffraction grating structure, wherein the diffraction grating structure diffracts light that has entered the second layer from the first layer and outputs the light from the second layer to the first layer.

An optical device according to another embodiment of the present invention includes: a first layer forming one end of an optical waveguide; and a second layer disposed on the first layer and having a lower refractive index than the first layer, wherein the second layer includes a diffraction grating structure, wherein the diffraction grating structure diffracts light that has entered the second layer from the first layer and outputs the light from the second layer to the first layer.

The present invention accomplishes optical coupling that allows the diffraction efficiency and the coupling efficiency of a diffraction grating to be independently determined. Specifically, since the diffraction efficiency and the coupling efficiency of a diffraction grating can be independently determined, the degree of freedom in designing a diffraction grating is increased. Thus, an optimal diffraction grating can be fabricated by independently controlling the coupling efficiency of the diffraction grating while sufficiently increasing the diffraction efficiency of the diffraction grating, whereby high diffraction efficiency and high coupling efficiency are achieved.

DETAILED DESCRIPTION OF THE PREFERRED EMBODIMENTS

Figure 1:
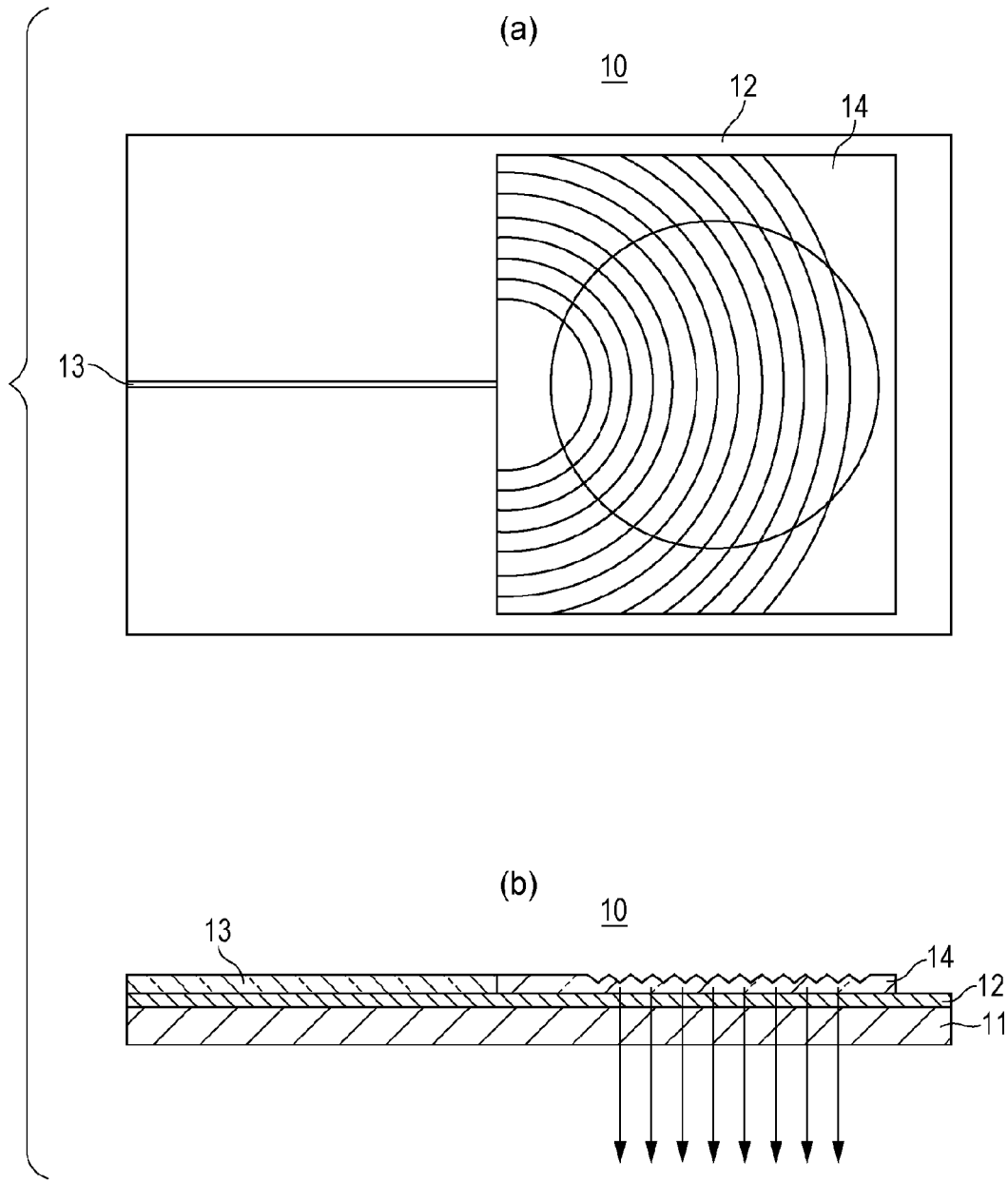
FIG. 1(a) schematically illustrates a top plan view of a prior art optical device including a diffraction grating structure formed by processing the same layer as a core layer of an optical waveguide.
FIG. 1(b) schematically illustrates a side view of a cross sectional view of a prior art optical device including a diffraction grating structure formed by processing the same layer as a core layer of an optical waveguide.

Hereinbelow, embodiments for carrying out the present invention are explained in detail with reference to the drawings. However, these embodiments are not intended to limit the invention in the claims. It should be noted that a combination of all the features described in the embodiments is not necessarily essential to solve the problems addressed above. Furthermore, the present invention can be implemented in various different modes and should not be construed as being limited to the description of the embodiments. Throughout the description of the embodiments, the same components or elements are denoted by the same reference numerals.

Figure 2:
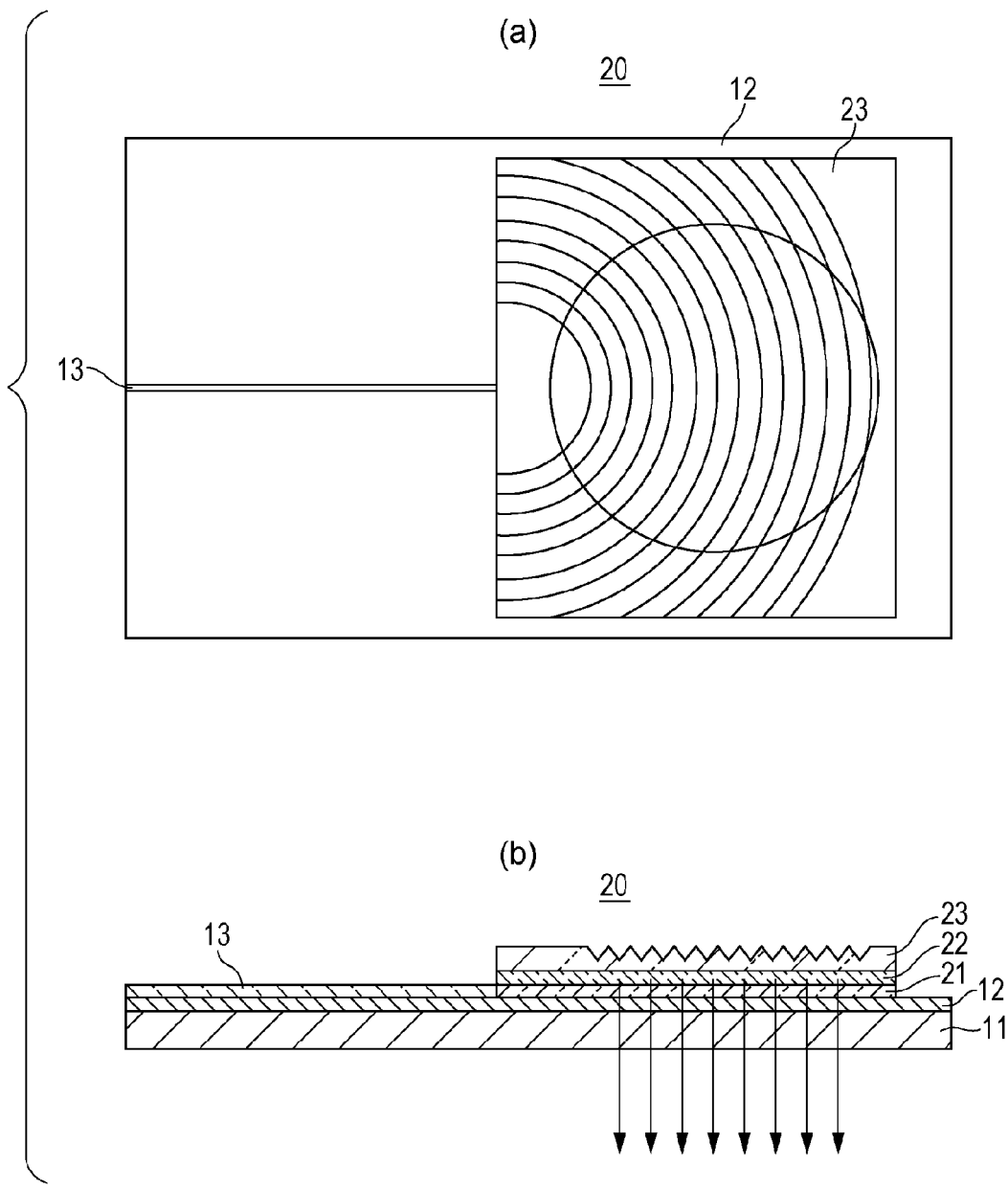
FIG. 2(a) schematically illustrates a top plan view of an optical device including a layer having a low refractive index and a layer including a diffraction grating structure on a core layer that forms one end of an optical waveguide, according to an embodiment of the present invention.
FIG. 2(b) schematically illustrates a side view of a cross-sectional view of an optical device including a layer having a low refractive index and a layer including a diffraction grating structure on a core layer that forms one end of an optical waveguide, according to an embodiment of the present invention.

FIGS. 2(a) and 2(b) schematically illustrate optical device 20 according to an embodiment of the present invention. Optical device 20 includes a layer having a low refractive index and a layer including a diffraction grating structure on a core layer that forms one end of an optical waveguide. FIG. 2(a) is a top plan view of optical device 20 and FIG. 2(b) is a cross sectional view of optical device 20 viewed from a side.

Similar to optical device 10, optical device 20 includes oxide layer 12 on silicon substrate 11 and silicon optical waveguide 13 on oxide layer 12. However, in optical device 20, first layer 21 that is made of a material such as silicon and that forms one end of silicon optical waveguide 13 does not have a diffraction grating structure. Second layer 22 made of a material having a lower refractive index than first layer 21, preferably, silicon nitride, silicon oxide, or silicon oxide nitride, is deposited on first layer 21. Third layer 23 made of a material such as silicon is deposited on second layer 22, and a diffraction grating structure is formed in third layer 23.

In optical device 20, a diffraction grating structure is not directly formed in first layer 21 that forms one end of silicon optical waveguide 13 but second layer 22 having a low refractive index is deposited on first layer 21, third layer 23 is deposited on second layer 22, and a diffraction grating structure is formed in third layer 23. This configuration facilitates fabrication of a diffraction grating structure. Moreover, since a diffraction grating structure is not directly formed in first layer 21 that forms one end of silicon optical waveguide 13, signal light is not diffracted in first layer 21 but led to second layer 22 and then to third layer 23 having the diffraction grating structure, where the signal light is diffracted.

Figure 3:
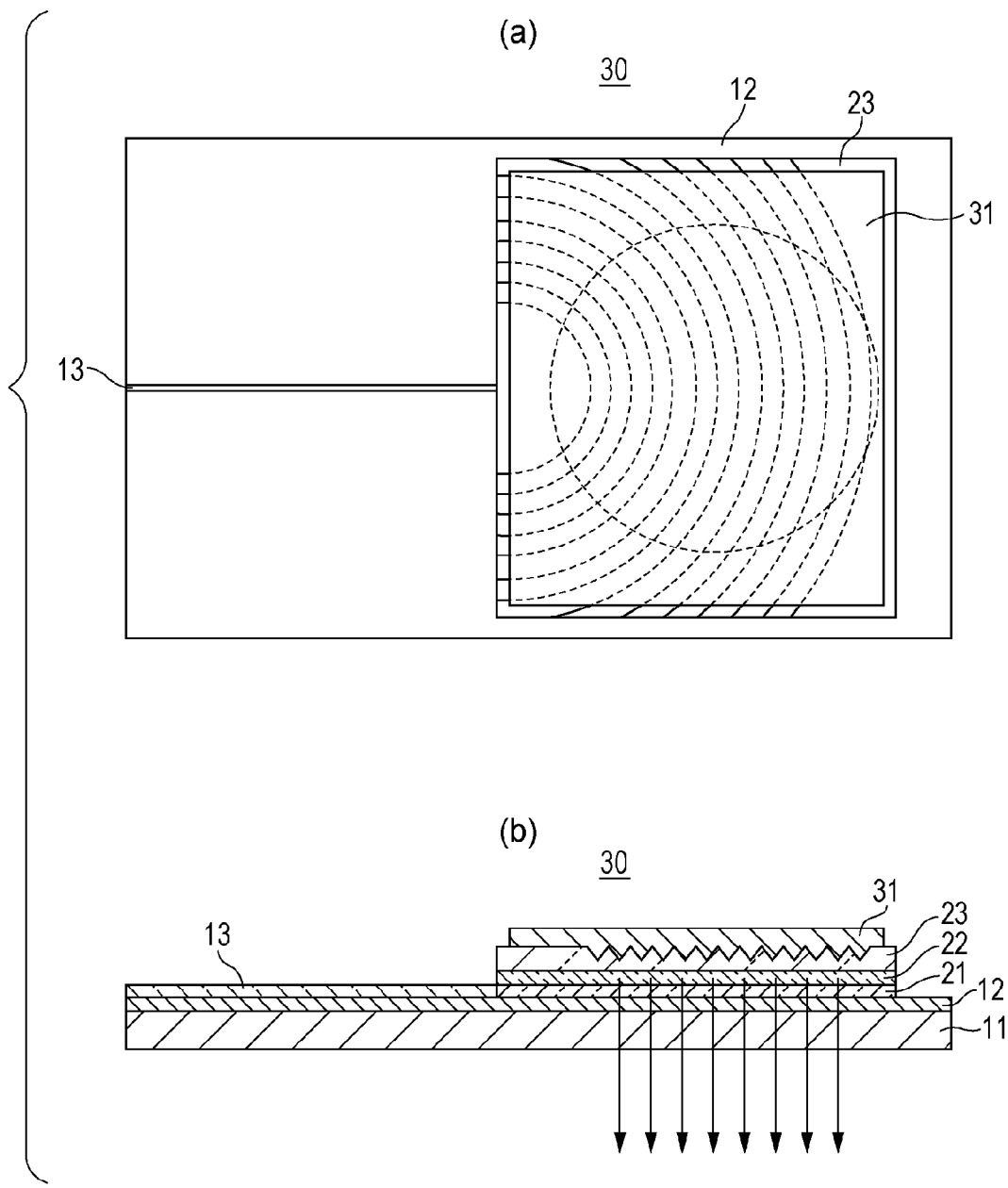
FIG. 3(a) schematically illustrates a top plan view of an optical device including a reflection film on the layer having the diffraction grating structure illustrated in FIGS. 2(a) and 2(b), according to an embodiment of the present invention.
FIG. 3(b) schematically illustrates a side view of a cross sectional view of an optical device including a reflection film on the layer having the diffraction grating structure illustrated in FIGS. 2(a) and 2(b), according to an embodiment of the present invention.

FIGS. 3(a) and 3(b) schematically illustrate optical device 30 including reflection film 31 deposited on third layer 23 with third layer 23 including a diffraction grating structure. By depositing reflection film 31 on third layer 23 including a diffraction grating structure, the direction of light diffracted in third layer 23 is limited to only a direction toward second layer 22, that is, downward direction, whereby the coupling efficiency can be increased.

Figure 4:
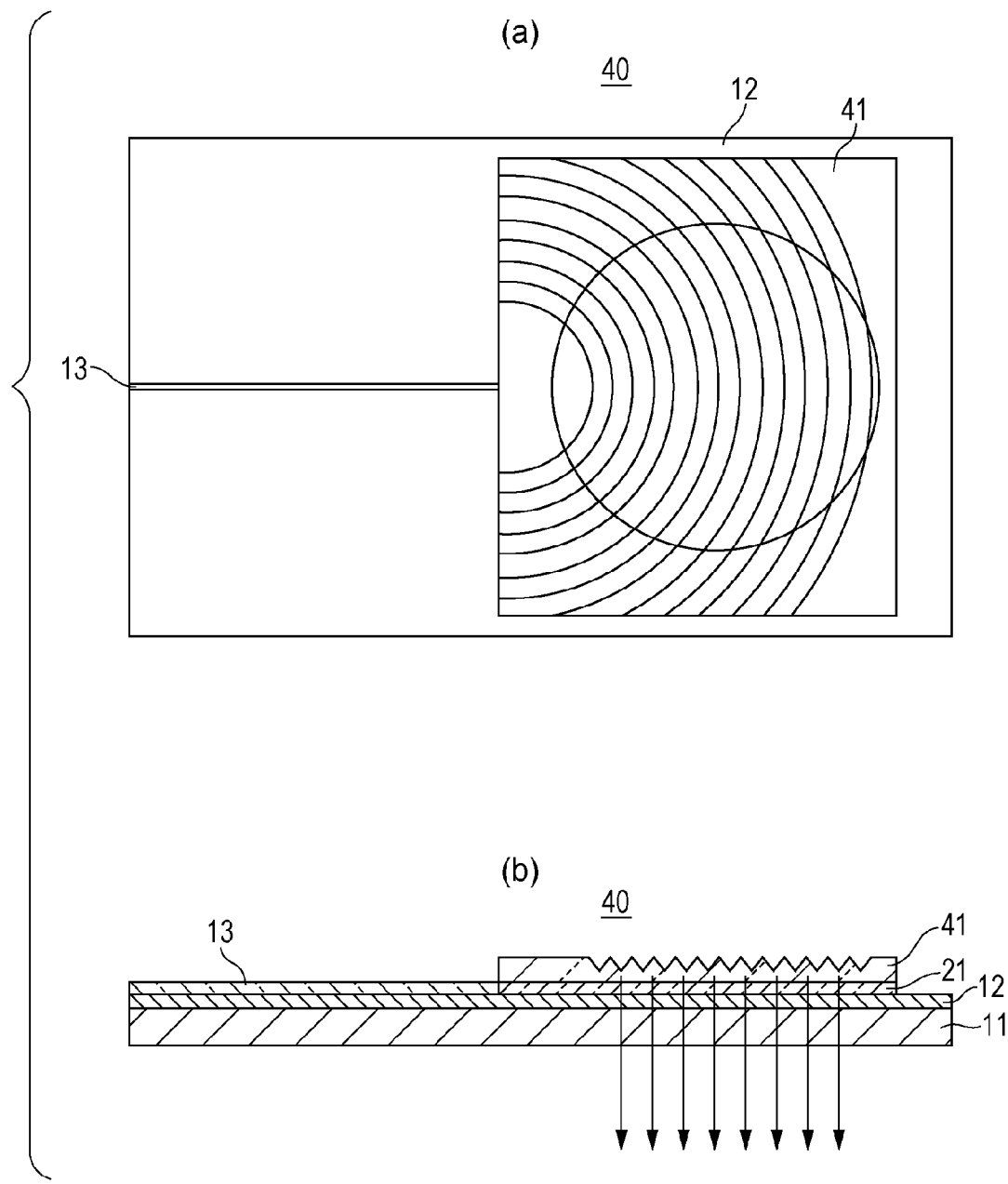
FIG. 4(a) schematically illustrates a top plan view of an optical device including a layer having a low refractive index and a diffraction grating structure on a core layer that forms an end of an optical waveguide, according to another embodiment of the present invention.
FIG. 4(b) schematically illustrates a side view of a cross-sectional view of an optical device including a layer having a low refractive index and a diffraction grating structure on a core layer that forms an end of an optical waveguide, according to another embodiment of the present invention.

FIGS. 4(a) and 4(b) schematically illustrate optical device 40 according to another embodiment of the present invention including a layer having a low refractive index and a diffraction grating structure on a core layer that forms an end of an optical waveguide. FIG. 4(a) is a top plan view of optical device 40 and FIG. 4(b) is a cross sectional view of optical device 40 viewed from a side.

Similar to optical device 10, optical device 40 includes oxide layer 12 on silicon substrate 11 and silicon optical waveguide 13 on oxide layer 12. Unlike optical device 10 but like optical device 20, in optical device 40, first layer 21 that is made of a material such as silicon and that forms one end of silicon optical waveguide 13 does not have a diffraction grating structure. Second layer 41 made of a material having a lower refractive index than first layer 21, preferably, silicon nitride, silicon oxide, or silicon oxide nitride, is deposited on first layer 21. A diffraction grating structure is formed in second layer 41.

Also in optical device 40, a diffraction grating structure is not directly formed in first layer 21 that forms one end of silicon optical waveguide 13 but second layer 41 having a low refractive index is deposited on first layer 21 and a diffraction grating structure is formed in second layer 41. This configuration facilitates fabrication of a diffraction grating structure. Moreover, since a diffraction grating structure is not directly formed in first layer 21 that forms one end of silicon optical waveguide 13, signal light is not diffracted in first layer 21 but led to second layer 41 having the diffraction grating structure, where the signal light is diffracted.

Figure 5:
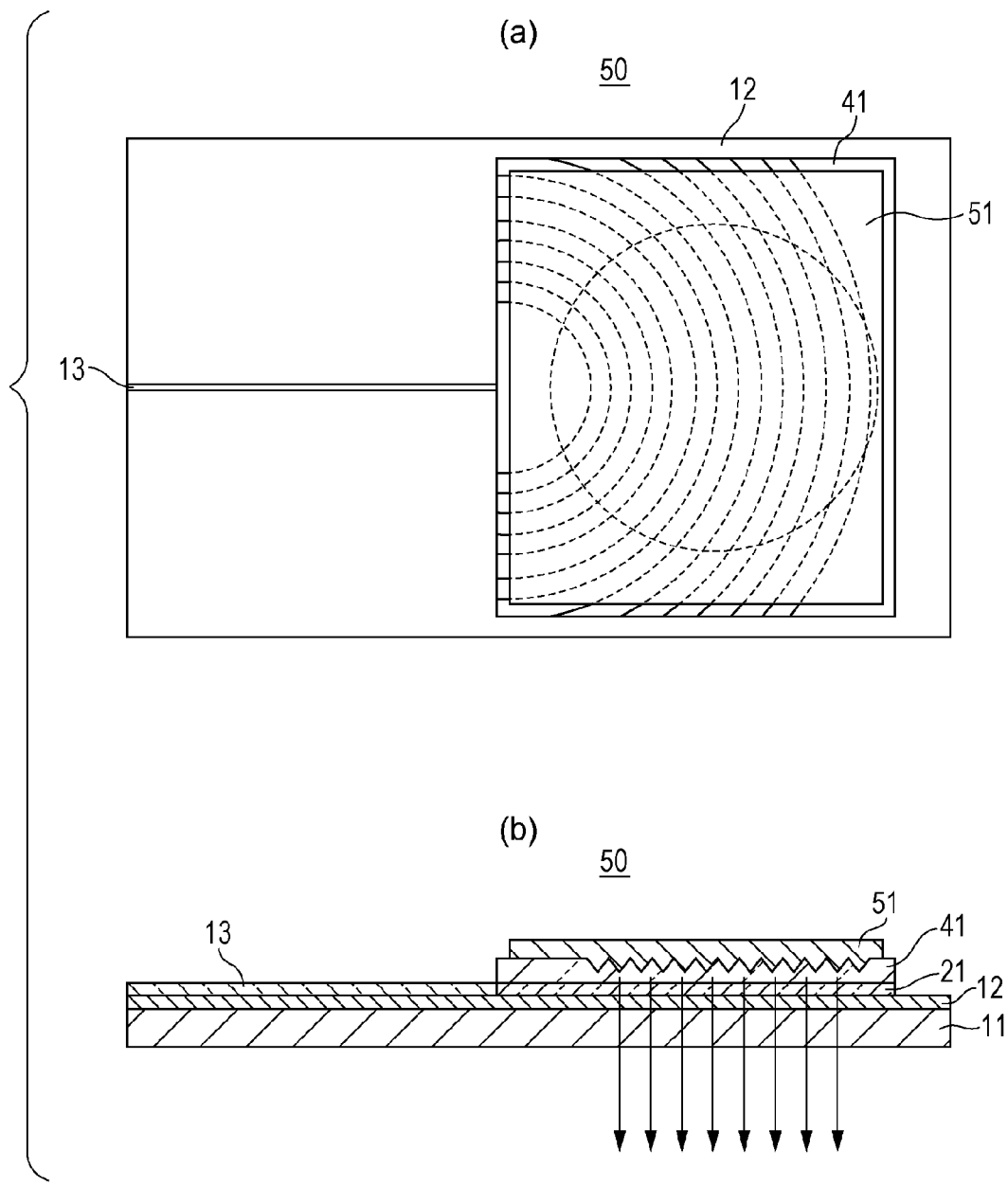
FIG. 5(a) schematically illustrates a top plan view of an optical device including a reflection film on the layer having a low refractive index and a diffraction grating structure illustrated in FIGS. 4(a) and 4(b).
FIG. 5(b) schematically illustrates a side view of a cross-sectional view of an optical device including a reflection film on the layer having a low refractive index and a diffraction grating structure illustrated in FIGS. 4(a) and 4(b).

FIGS. 5(a) and 5(b) schematically illustrate optical device 50 including reflection film 51 on second layer 41 including a diffraction grating structure. By depositing reflection film 51 on second layer 41 including a diffraction grating structure, the direction of light diffracted in second layer 41 is limited to only a direction toward first layer 21, that is, downward direction, whereby the coupling efficiency can be increased.

FIGS. 2(a) to 4(b) illustrate the cases where signal light is taken out or output to the outside from silicon optical waveguide 13. However, optical devices 20, 30, 40, and 50 can be also used for taking in or inputting signal light from the outside to silicon optical waveguide 13, whereby high diffraction efficiency and high coupling efficiency can be achieved.

Although the present invention has been described above using the embodiments, the technical scope of the present invention is not limited to the scope described in the above-described embodiments. The embodiments can be changed or modified in various manners and embodiments resulting from such changes or modifications can naturally be included in the technical scope of the present invention.

I claim:

1. An optical device comprising:
a first layer forming one end of an optical waveguide;
a second layer disposed on the first layer and having a lower refractive index than the first layer; and
a third layer disposed on the second layer and including a diffraction grating structure, wherein the diffraction grating structure diffracts light that has entered the second layer from the first layer and outputs the light from the second layer to the first layer.

2. The optical device according to claim 1, wherein the first layer is made of silicon.

3. The optical device according to claim 1, wherein the second layer is made of silicon nitride, silicon oxide, or silicon oxide nitride.

4. The optical device according to claim 1, wherein the third layer is made of silicon.

5. The optical device according to claim 1, further comprising a reflection film on the diffraction grating structure of the third layer.

6. The optical device according to claim 5, wherein the reflection film is made of metal.

7. An optical device comprising:
a first layer forming one end of an optical waveguide;
a second layer disposed on the first layer and having a lower refractive index than the first layer, wherein the second layer includes a diffraction grating structure, wherein the diffraction grating structure diffracts light that has entered the second layer from the first layer and outputs the light from the second layer to the first layer.

8. The optical device according to claim 7, further comprising a reflection film on the diffraction grating structure of the second layer.

9. The optical device according to claim 7, wherein the first layer is made of silicon.

10. The optical device according to claim 7, wherein the second layer is made of silicon nitride, silicon oxide, or silicon oxide nitride.

11. The optical device according to claim 8, wherein the reflection film is made of metal.

12. An optical device comprising:
a first layer forming one end of an optical waveguide;
a second layer disposed on the first layer and having a lower refractive index than the first layer, wherein the second layer includes a diffraction grating structure that diffracts light that has entered the second layer from the first layer and outputs the light from the second layer to the first layer; and
a reflection film on the diffraction grating structure of the second layer.

13. An optical device comprising:
a first layer forming one end of an optical waveguide;
a second layer disposed on the first layer and having a lower refractive index than the first layer;
a diffraction grating structure, wherein the diffraction grating structure is formed in the second layer but not in the first layer; and
further comprising a reflection film directly on the diffraction grating structure of the second layer.

14. The optical device according to claim 13, wherein the diffraction grating structure diffracts light that has entered the second layer from the first layer and outputs the light from the second layer to the first layer.

15. The optical device according to claim 13, wherein the reflection film is made of metal.

* * * * *